Dec. 15, 1942.　　　C. C. FRANCK　　　2,304,994
TURBINE CYLINDER COOLING
Filed June 20, 1941　　　2 Sheets-Sheet 1

WITNESSES:
James R. Mosser
E. H. Lutz

INVENTOR
CLARENCE C. FRANCK.
BY
ATTORNEY

Dec. 15, 1942.　　　　C. C. FRANCK　　　　2,304,994
TURBINE CYLINDER COOLING
Filed June 20, 1941　　　2 Sheets-Sheet 2
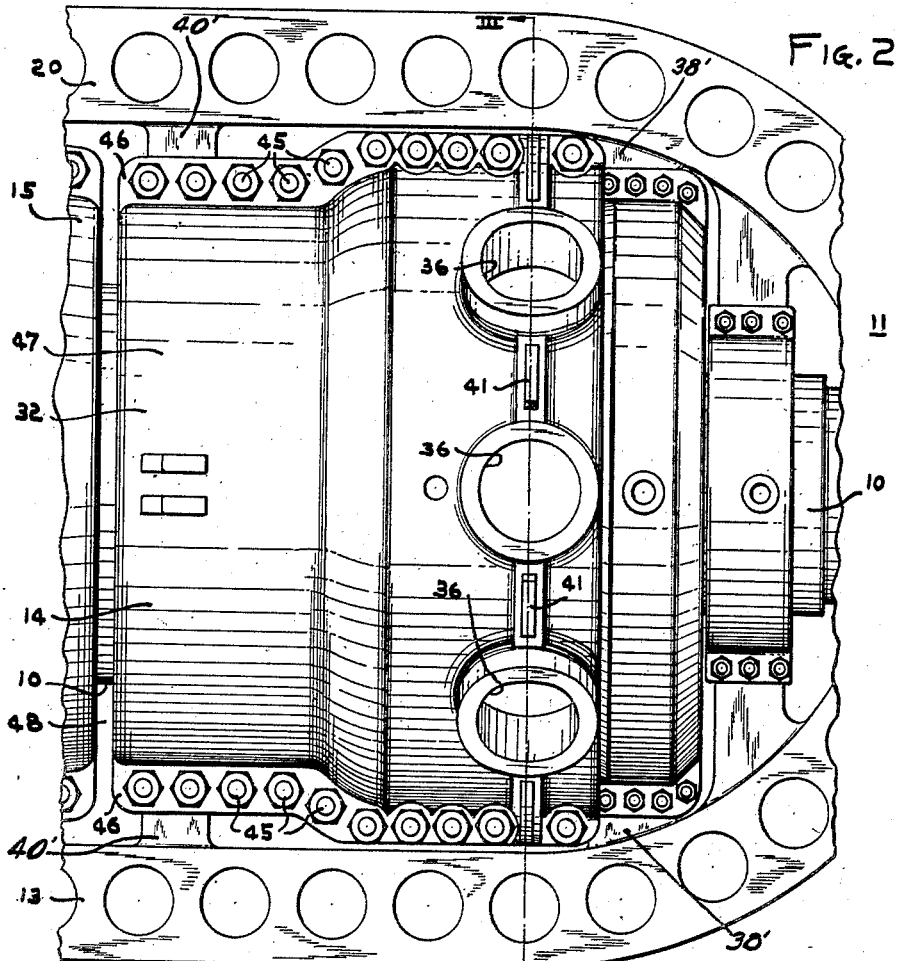
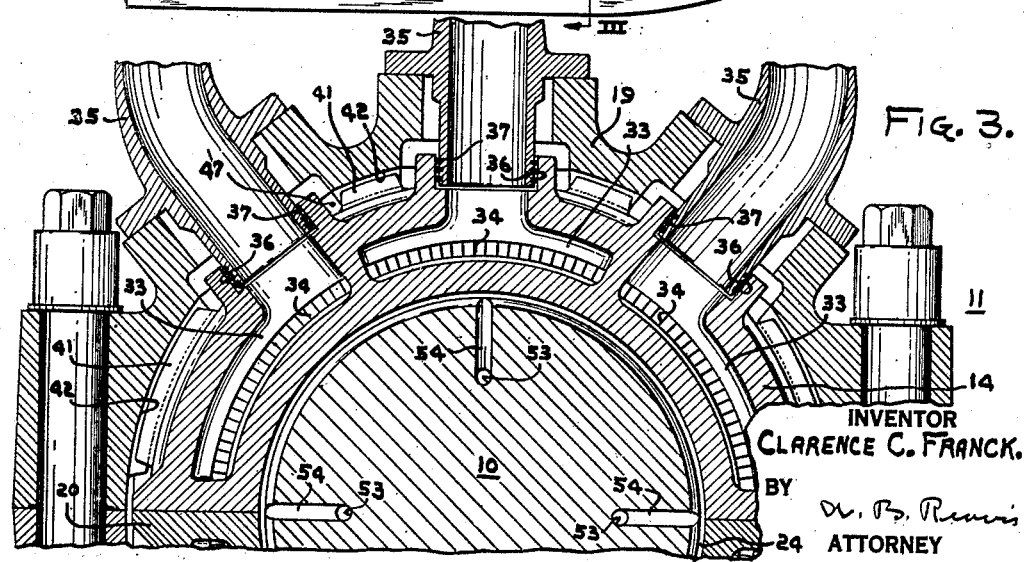
INVENTOR
CLARENCE C. FRANCK.
BY
ATTORNEY Patented Dec. 15, 1942

2,304,994

UNITED STATES PATENT OFFICE 2,304,994

TURBINE CYLINDER COOLING

Clarence C. Franck, Swarthmore, Pa., assignor to Westinghouse Electric & Manufacturing Company, East Pittsburgh, Pa., a corporation of Pennsylvania Application June 20, 1941, Serial No. 398,902

4 Claims. (Cl. 253—69)

The invention relates to steam turbines and it has for its object to provide apparatus of this character constructed and arranged to limit temperature conditions of the structure, particularly the bolting and adjacent parts, at the high-pressure end so as to minimize distortion and maintain steam tightness at the joints.

These and other objects are effected by the invention as will be apparent from the following description and claims taken in accordance with the accompanying drawings, forming a part of this application, in which:

Fig. 2 is a horizontal plane view of the turbine showing the outer cover removed; and, Fig. 3 is a sectional view taken along the lines III—III of Figs. 1 and 2.

Figure 1:
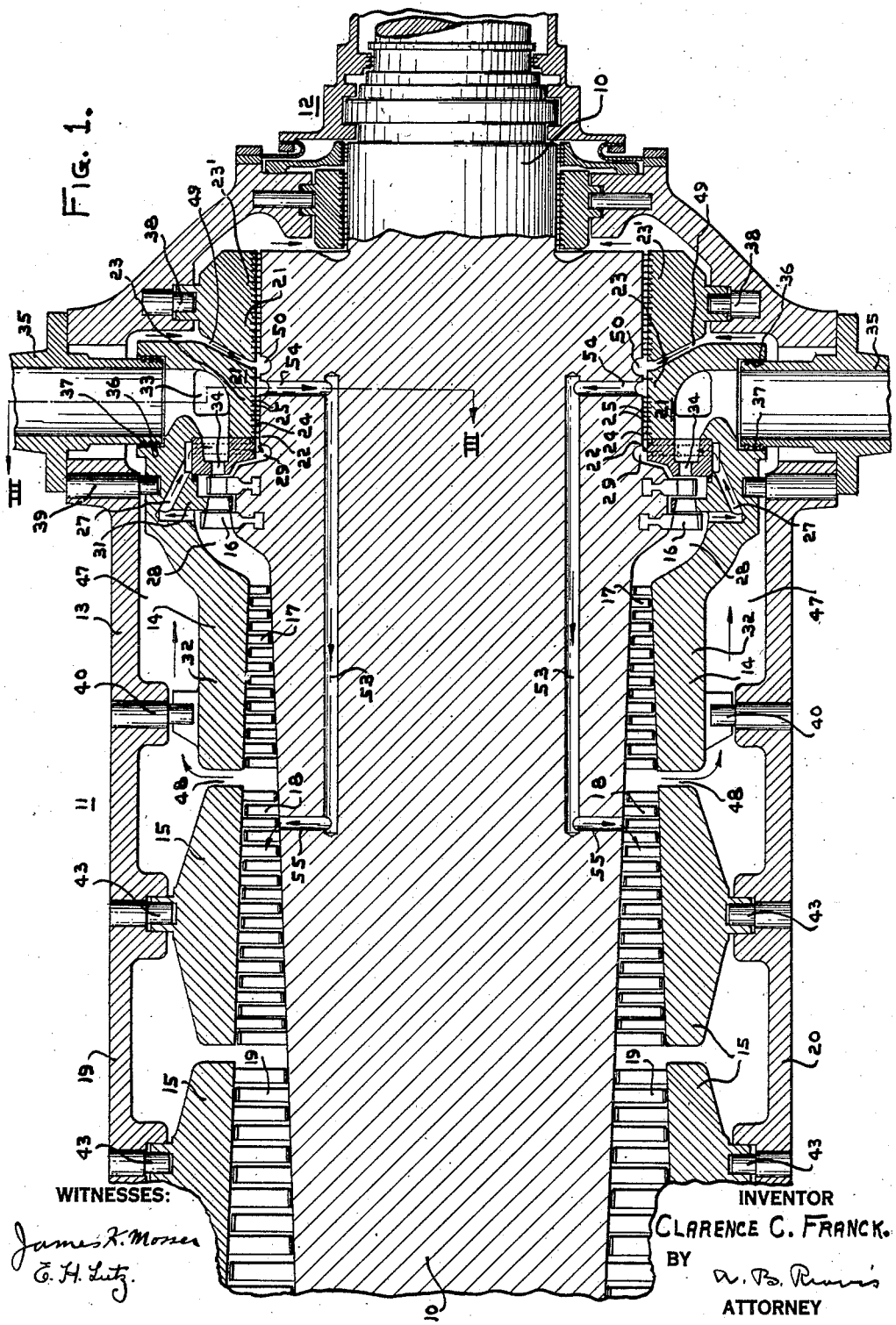
Fig. 1 is a longitudinal sectional view of a turbine having the improvement applied thereto.

In the drawings, there is shown a turbine including a rotor, at 10, a cylinder construction, at 11, and glands, at 12, only the one at the high-pressure end being shown. The cylinder construction includes a cylinder or housing 13 carying an interior tubular construction 14 and one or more blade rings 15.

The turbine includes energy-abstracting sections 16, 17, 18 and 19 through which steam flows in series, each section comprising the usual blading carried by the rotor and by the cylinder construction, the tubular construction and blade ring parts of the latter carrying the stationary blading.

The cylinder 13 has upper and lower halves or parts 19 and 20 provided with flanges bolted together in the usual way. Likewise, the tubular construction 14 and the blade rings 15 are made in upper and lower halves and bolted together, the bolts being accessible when the upper half 19 of the cylinder is removed.

A dummy construction, at 21, is arranged between the high-pressure gland, at 12, and the initial energy-abstracting section 16, the dummy construction serving to balance the steam thrust imposed on the rotor due to the energy-abstracting sections 17, 18 and 19. The dummy construction includes a piston 22 provided on the rotor, the ring portions 23 and 23' encompassing the piston and defining, with respect thereto, the annular sealing space 24, the latter being sealed by any suitable means for example, labyrinth packing 25.

The tubular construction 14 has an equalizing passage 27 connecting the space 28 between the energy-abstracting sections 16 and 17 with the annular space 29 at the inner end of the dummy construction, so that the piston 22 is subject to pressure of steam supplied to the second energy-abstracting section 17.

The tubular construction 14 includes the dummy ring portion 23 and the blade ring portions 31 and 32 for the stationary blades of the energy-abstracting sections 16 and 17. Also, the tubular construction is preferably formed with an annular arrangement of nozzle chambers 33 incorporated within the dummy ring portion 23. Steam is supplied from each nozzle chamber having a group of nozzles 34 to the blading of the initial energy-abstracting section 16.

Each nozzle chamber may be supplied with steam by a separate conduit 35 extending through and fastened to the cylinder 13 and having its inner end telescoping within an opening 36 for the chamber, suitable packing 37 providing for relative movement while maintaining steam tightness.

The dummy ring portion 23' and the tubular construction 14 are supported from the cylinder by pins 38 and 39 disposed at either side of the axial plane of the steam inlet conduits 35, and, due to the substantial axial extent of the member 14, the latter is also supported by pins 40 providing for relative axial movement with respect to the cylinder. The ring portion 23' and the member 14 are located vertically within the cylinder by means of keys or supports 38' and 40' (Fig. 2) arranged radially in the planes or zones of the pins 39 and 40, respectively. The tubular construction is furthermore supported so as to hold the portion thereof provided with the nozzle chambers 33 in a definite axial position with respect to the cylinder so as to avoid imposition of axial thrusts on the pins 39, the support for this purpose being provided by tongues 41 formed on the dummy ring portion and fitting grooves 42 formed interiorly of the cylinder. The blade rings 15 are each supported by pins 43 providing for maintenance of the coaxial relation thereof with respect to the rotor while allowing for relative expansion and contraction with respect to the cylinder.

It is desirable to protect the cylinder structure, particularly the bolting and contiguous parts such as the bolts 45 and the flange portions 46 of the tubular construction 14, against excessive temperature effects. Accordingly, the tubular construction has its exterior spaced inwardly from the interior of the cylinder to provide an annular passage 47 having one end communicating with the space 48 between the energy-abstracting sections 17 and 18 and substantially enveloping the exterior of the construction. The other end of the annular passage is connected, by a passage 49 formed between the dummy ring portions, to the dummy annular sealing space 24 at a suitable point intermediately of the length of the latter. Preferably, the dummy piston is formed with a circumferential channel providing an annular chamber 50 in communication with the discharge end of the passage 49. With the discharge end of the passage 49 connected to the annular dummy sealing space where the pressure is lower than that existing in the space 48, flow is induced in the annular passage 47; and, as the steam so flowing is at a temperature lower than steam entering through the conduits 35 or exhausting from the initial energy-abstracting section 16, it will exert a cooling or temperature-limiting effect on all contiguous structure, including the bolts 45 and the flanges 46.

The leakage of the high-pressure gland induces flow in the dummy sealing space 24 and the pressures in the latter progressively decrease so that such a pressure condition exists at the discharge end of the passage 49 that flow is induced in the annular passage 47 for the purposes already stated. In addition to the aforesaid temperature-limiting effect produced by flow of steam in the passage 47, steam enters from the latter into the annular dummy sealing space and satisfies to a large extent the gland leakage requirements, thereby minimizing the quantity of steam that would otherwise flow from the space 29 to the gland. More importantly, however, steam supplied from the annular passage 47 to the dummy annular sealing space 24 exerts a substantial temperature-limiting effect on the dummy construction. Steam flowing from the space 29 and undergoing progressive decline in pressure would be superheated, as none of its heat is converted into mechanical work, and result in excessive temperatures of parts of the dummy construction with likelihood of distortion or uneven expansion and consequent sealing difficulties thereof. On the other hand, steam supplied from the annular chamber 50 to the annular sealing space 24 is of substantially lower temperature, as such steam has had a part of its heat converted into mechanical work in the energy-abstracting section 17.

Increased flow of steam in the annular passage 47 may be provided by arranging for discharge of steam passing through the passage to a suitable stage of the turbine. For example, the rotor, at 10, is provided with a passage 53 having one end 54 connected with the annular gland sealing space 24, and having its other end 55 connected to a suitable low-pressure stage. Therefore, steam flowing through the passage 47 and discharged by the passage 53 to the low-pressure stage, not only exerts the aforesaid temperature-limiting effects, but heat energy thereof is converted into mechanical work in the low-pressure stages of the turbine. To minimize the heating effect on the dummy construction of steam flowing along the annular sealing space 24 from the chamber 29, the inlet end 54 of the passage is preferably connected with the annular sealing space between the annular chamber 50 and the inner end of the dummy construction, with the result that steam supplied from the annular chamber 50 flows to the outer end of the dummy construction in sufficient quantity to satisfy gland leakage, and flows from such chamber in an inward direction along the sealing space to the inlet end 54 of the passage, thereby producing an increased temperature-limiting effect on the dummy construction.

While the invention has been shown in but one form, it will be obvious to those skilled in the art that it is not so limited, but is susceptible of various changes and modifications without departing from the spirit thereof, and it is desired, therefore, that only such limitations shall be placed thereupon as are specifically set forth in appended claims.

What is claimed is:

1. In a turbine, a cylinder; a rotor; blading arranged to provide first and second energy-abstracting sections and including moving blades carried by the rotor and stationary blades supported from the cylinder; a dummy construction including a dummy piston carried by the rotor, dummy ring portions encompassing the dummy piston and defining an annular dummy sealing passage, and sealing means for said passage; a tubular construction disposed within the cylinder and including upper and lower halves and externally accessible bolts for holding the halves together; said tubular construction embodying first and second blade ring portions carrying the stationary blades of the first and second energy-abstracting sections and the dummy ring portion adjacent to the first section; the first blade ring portion being arranged between the dummy ring portion and the second blade ring portion; and means utilizing steam discharging from the second energy-abstracting section to limit the temperature of the exterior portion of the tubular construction and the bolts for holding the halves of the latter together and comprising having the tubular construction spaced from the cylinder to form an annular passage substantially encompassing the tubular construction and in open communication with the exhaust space of the second energy-abstracting section and having a passage formed between the dummy ring portions for placing said annular passage in communication with the dummy sealing passage intermediately of the length of the latter.

2. In a turbine, a cylinder; a rotor; first and second energy-abstracting sections including moving blades carried by the rotor and stationary blades supported from the cylinder and the first energy-abstracting section including nozzles for supplying steam to the blades thereof; a dummy construction including a dummy piston, first and second dummy ring portions encompassing the piston and cooperating with the latter to define an annular dummy sealing passage, and sealing means for said passage; a tubular construction supported from and disposed within the cylinder and comprising upper and lower halves and externally accessible bolts for holding the halves together; said tubular construction embodying the first dummy ring portion, an annular portion providing nozzle chambers for the nozzles, and first and second blade ring portions carrying the stationary blades of the first and second energy-abstracting sections; the first blade ring portion being arranged between the first dummy ring portion and the second blade ring portion; and means utilizing steam discharging from the second energy-abstracting section to limit the temperature of the exterior portion of the tubular construction and the bolts for holding the halves of the latter together and comprising having the tubular construction spaced from the cylinder to form an annular passage substantially encompassing the tubular construction and in open communication with the discharge space of the second energy-abstracting section and having a passage formed between the dummy ring portions for placing said annular passage in communication with the dummy sealing passage intermediately of the length of the latter.

3. In a turbine, a cylinder; a rotor construction; a plurality of energy-abstracting sections including moving blades carried by the rotor and stationary blades supported from the cylinder and the initial energy-abstracting section including nozzles for supplying steam to the blades thereof; a dummy including a dummy piston portion carried by the rotor, first and second dummy ring portions encompassing the piston portion and cooperating with the latter to define an annular dummy sealing passage, and sealing means for the passage; a tubular construction supported from and disposed within the cylinder and including upper and lower halves and bolts accessible externally of the construction for holding the halves together; said tubular construction embodying the first dummy ring portion and including an annular portion providing nozzle chambers for the nozzles and first and second blade ring portions carrying the stationary blades of the first and second energy-abstracting sections; the first blade ring portion being arranged between the first dummy ring portion and the second blade ring portion; means including a passage formed in the tubular construction and providing for supplying of steam at the discharge pressure of the first energy-abstracting section to the space at the inner end of the dummy construction; one of said portions of the dummy construction having an annular chamber formed therein; means utilizing steam discharging from the second energy-abstracting section to limit the temperature of the exterior portion of the tubular construction and of the bolts for holding the halves thereof together and comprising having the tubular construction spaced from the cylinder to form an annular passage substantially encompassing the tubular construction and in open communication with the discharge space of the second energy-abstracting section and having a passage formed between the dummy ring portions for placing said annular passage in communication with said annular chamber formed in one of the dummy portions; and means including a passage formed in one of said constructions for connecting the annular dummy sealing space between said annular chamber and the inner end of the dummy with a suitable stage of one of said energy-abstracting sections.

4. In a turbine, a cylinder; a rotor; a plurality of energy-abstracting sections including moving blades carried by the rotor and stationary blades supported from the cylinder and the initial energy-abstracting section including nozzles for supplying steam to the blades thereof; a dummy construction including a dummy piston portion carried by the rotor, first and second dummy ring portions encompassing the piston portion and cooperating with the latter to define an annular dummy sealing passage, and sealing means for the passage; a tubular construction supported from and disposed within the cylinder and including upper and lower halves and bolts accessible externally of the construction for holding the halves together; said tubular construction embodying the first dummy ring portion and including an annular portion providing nozzle chambers for the nozzles and first and second blade ring portions carrying the stationary blades of the first and second energy-abstracting sections; the first blade ring portion being arranged between the first dummy ring portion and the second blade ring portion; means including a passage formed in the tubular construction and providing for supplying of steam at the discharge pressure of the first energy-abstracting section to the space at the inner end of the dummy construction; one of said portions of the dummy construction having an annular chamber formed therein; means utilizing steam discharging from the second energy-abstracting section to limit the temperature of the exterior portion of the tubular construction and of the bolts for holding the halves thereof together and comprising having the tubular construction spaced from the cylinder to form an annular passage substantially encompassing the tubular construction and in open communication with the discharge space of the second energy-abstracting section and having a passage formed between the dummy ring portions for placing said annular passage in communication with said annular chamber formed in one of the dummy portions; and means for conducting steam from said annular chamber to a suitable stage of one of the energy-abstracting sections and including a passage formed in the rotor.

CLARENCE C. FRANCK.